United States Patent
Cavanaugh et al.

(10) Patent No.: US 6,956,078 B2
(45) Date of Patent: *Oct. 18, 2005

(54) CONCENTRATED FLUOROPOLYMER DISPERSIONS

(75) Inventors: Robert John Cavanaugh, Hilton Head Island, SC (US); Clay Woodward Jones, Washington, WV (US); Kazuo Konabe, Shimizu (JP); Daniel N. Levy, Collex (CH); Philippe Andre Fernand Thomas, Helecine (BE); Theodore A. Treat, Washington, WV (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 328 days.

This patent is subject to a terminal disclaimer.

(21) Appl. No.: 10/099,368

(22) Filed: Mar. 13, 2002

(65) Prior Publication Data

US 2003/0130393 A1 Jul. 10, 2003

Related U.S. Application Data

(60) Provisional application No. 60/345,300, filed on Jan. 4, 2002.

(51) Int. Cl.[7] ............................ C08K 5/06; C08L 27/18; B32B 27/28
(52) U.S. Cl. .................... 524/378; 524/379; 524/380; 524/805; 523/201; 428/421; 428/422
(58) Field of Search ................... 524/378, 379, 524/380, 805; 523/201; 428/421, 422

(56) References Cited

U.S. PATENT DOCUMENTS

| | | | |
|---|---|---|---|
| 3,037,953 A | * 6/1962 | Marks et al. ............... | 524/546 |
| 4,391,940 A | 7/1983 | Kuhls et al. | |
| 5,324,785 A | * 6/1994 | Noda et al. ................. | 525/276 |
| 5,707,763 A | * 1/1998 | Shimizu et al. ............. | 429/217 |
| 6,498,207 B1 | * 12/2002 | Hoshikawa et al. ........ | 524/378 |
| 6,841,594 B2 | * 1/2005 | Jones et al. ................. | 523/201 |

FOREIGN PATENT DOCUMENTS

| | | |
|---|---|---|
| EP | 0 525 660 A1 | 2/1993 |
| EP | 0 735 093 A1 | 10/1996 |
| EP | 1 006 129 A2 | 6/2000 |
| EP | 1 059 333 A1 | 12/2000 |

OTHER PUBLICATIONS

Sperati & Starkwather, Fortschr. Hochpolym–Forsch. BD. 2, S.465–495 (1961).

* cited by examiner

*Primary Examiner*—Tae H. Yoon

(57) ABSTRACT

An aqueous dispersion composition of about 30 to about 70 weight % non-melt-processible fluoropolymer particles having a standard specific gravity (SSG) of less than 2.225 and about 2 to about 11 weight % surfactant based on the weight of said fluoropolymer comprising a compound or mixture of compounds of the formula:

$$R(OCH_2CH_2)_nOH$$

wherein R is a branched alkyl, branched alkenyl, cycloalkyl, or cycloalkenyl hydrocarbon group having 8–18 carbon atoms and n is an average value of 5 to 18. The fluoropolymer particles of the dispersion comprise a core of high molecular weight polytetrafluoroethylene and a shell of lower molecular weight polytetrafluoroethylene or modified polytetrafluoroethylene. Preferably, the aqueous dispersion composition comprises about 45 to about 65 weight % non-melt-processible fluoropolymer particles.

28 Claims, 1 Drawing Sheet

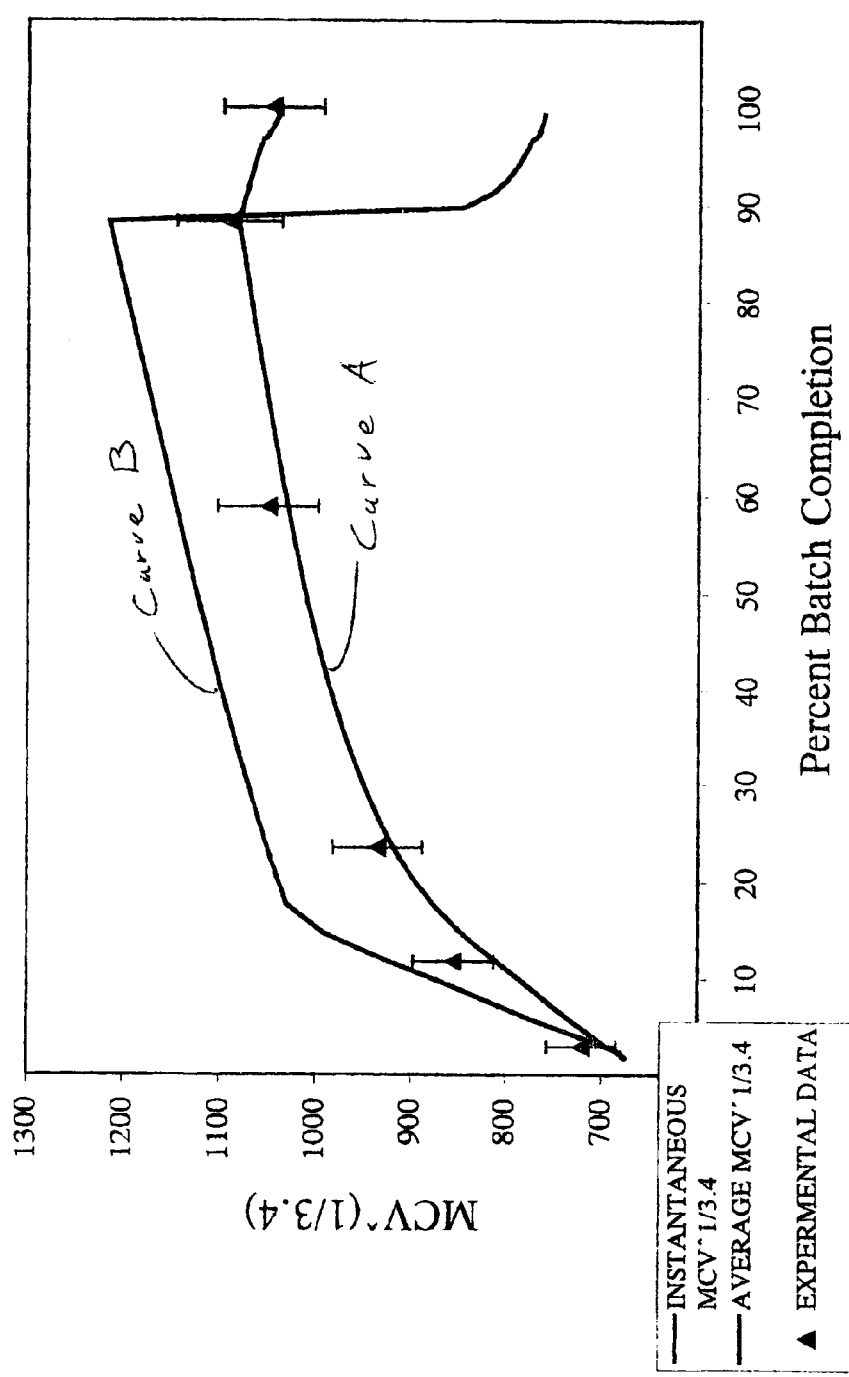

CONCENTRATED FLUOROPOLYMER DISPERSIONS

FIELD OF THE INVENTION

This invention relates to dispersions of non-melt-processible fluoropolymers and coatings formed from the dispersions.

BACKGROUND OF THE INVENTION

Fluoropolymers are applied to a wide number of substrates in order to confer release, chemical and heat resistance, corrosion protection, cleanability, low flammability, and weatherability. Coatings of polytetrafluoroethylene (PTFE) homopolymers and modified PTFE provide the highest heat stability among the fluoropolymers, but unlike tetrafluoroethylene (TFE) copolymers, cannot be melt processed to form films and coatings. Therefore other processes have been developed for applying coatings of PTFE homopolymers and modified PTFE. One such process is dispersion coating which applies the fluoropolymer in dispersion form. Dispersion coating processes typically employ such fluoropolymer dispersions in a more concentrated form than the as-polymerized dispersion. These concentrated dispersions contain a significant quantity of surfactant, e.g. 6–8 weight percent. For example, U.S. Pat. No. 3,037,953 to Marks et al. discloses production of suitable coating dispersions by the concentration of low solids, basic polytetrafluoroethylene aqueous dispersion using a nonionic surfactant. Marks et al. achieves concentration by adding specific amounts of ethoxylates of either alkyl phenols or aliphatic alcohols to the dispersion, followed by heating the dispersion at 50 to 80° C., whereby an upper clear aqueous layer is formed and the polymer particles concentrate in a lower aqueous layer, and decanting the upper layer.

Using concentrated dispersions, dispersion coating processes include the steps of applying concentrated dispersion to a substrate by common techniques such as spraying, roller or curtain coating; drying the substrate to remove volatile components; and baking the substrate. When baking temperatures are high enough, the primary dispersion particles fuse and become a coherent mass. Baking at high temperatures to fuse the particles is often referred to as sintering. The baking process associated with dispersion coating results in the emission of volatile components from the dispersion composition as the polymer particles fuse. In order to insure stability of the dispersions, some nonionic surfactants have been used that require high processing temperatures for removal during coating manufacture. The most commonly used surfactants, phenol ethoxylates, can decompose to form harmful compounds that may have adverse environmental impact. These thermally degrade and cause discoloration to the product, or produce tar-like substances that accumulate on the walls of the baking equipment and can be transferred to the product causing contamination. These degradation products may also lead to fires in the coating equipment.

For a number of dispersion coating applications such as curtain coating or seriography, a fraction of the coating stream is deposited on the substrate requiring the remainder of the stream to be recycled. The recycled fraction needs to be able to withstand the subsequent multiple pumping and mixing operations necessary for a continuous process. A dispersion suitable for such processing should not easily coagulate when subjected to shearing forces. The resistance of the dispersion to premature coagulation can be measured by a parameter known as gel time and is an indication of the shear stability of the dispersion.

Prior art disclosures have tried to improve concentrated dispersions by selecting nonionic surfactants that can achieve concentration at lower temperatures, or easier removal of the surfactant during sintering, or reduce harmful affects to the environment during processing. Such disclosures are represented in U.S. Pat. No. 3,301,807 to Hoashi; U.S. Pat. No. 3,704,272 to Holmes; and U.S. Pat. No. 6,153,688 to Miura et al. However, the teachings of the prior art have not recognized the importance that surfactant can have on the shear stability of dispersion composition.

Despite the advances made in dispersion coating of PTFE, products that lead to robust and environmentally clean manufacturing processes while still maintaining excellent coating performance and shear stability are desired.

BRIEF SUMMARY OF THE INVENTION

The invention provides for an aqueous dispersion composition of about 30 to about 70 weight % non-melt-processible fluoropolymer particles having a standard specific gravity (SSG) of less than 2.225 and about 2 to about 11 weight % surfactant based on the weight of the fluoropolymer comprising a compound or mixture of compounds of the formula:

wherein R is a branched alkyl, branched alkenyl, cycloalkyl, or cycloalkenyl hydrocarbon group having 8–18 carbon atoms and n is an average value of 5 to 18. The fluoropolymer particles of the dispersion comprise a core of high molecular weight polytetrafluoroethylene and a shell of lower molecular weight polytetrafluoroethylene or modified polytetrafluoroethylene. Preferably the aqueous dispersion composition comprises about 45 to about 65 weight % non-melt-processible fluoropolymer particles.

In a preferred embodiment of the invention, the average melt creep viscosity of the polytetrafluoroethylene of the core is greater than about $1.2 \times 10^{10}$ Pa·s. In a more preferred embodiment the average melt creep viscosity of the polytetrafluoroethylene or modified polytetrafluoroethylene of the shell is greater than about $9 \times 10^9$ Pa·s.

Preferred concentrated dispersions of the invention include a non-melt-processible fluoropolymer with a shell of polytetrafluoroethylene or modified polytetrafluoroethylene that is sufficiently low in molecular weight that a dispersion of about 60 weight % fluoropolymer and about 6 weight % surfactant has a gel time greater than about 700 seconds.

Further the invention provides for coating compositions of the concentrated dispersions and substrates such as metal and glass fabric coated with the dispersion.

Dispersion compositions of this invention possessing high molecular weight and an unexpectedly high shear stability address the need for coating compositions for use in economical, continuous, environmentally clean manufacturing operations.

BRIEF DESCRIPTION OF THE DRAWINGS

FIG. 1 is a graph showing the average melt creep viscosity (MCV) and the instantaneous melt creep viscosity, both to the $\frac{1}{3.4}$ power, of polymer formed during the process of this invention with respect to percent batch completion.

DETAILED DESCRIPTION OF THE INVENTION

The invention relates to an aqueous dispersion of non-melt-processible fluoropolymer particles and an nonionic surfactant, where the combination of the fluoropolymer and the surfactant result in a dispersion composition having a surprisingly high shear stability. The dispersion of this invention comprises between about 30 to about 70 weight % non-melt-processible fluoropolymer particles, preferably between about 45 to about 65 weight % non-melt-processible fluoropolymer particles, and about 2 to about 11 weight % surfactant, preferably about 3 to about 11 weight %, based on the weight of said fluoropolymer.

Fluoropolymers

The fluoropolymer particles of this invention comprise a core of high molecular weight polytetrafluoroethylene (PTFE) and a shell of lower molecular weight polytetrafluoroethylene or modified polytetrafluoroethylene.

Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 weight %, more preferably less than 0.5 weight %. The modifying comonomer can be, for example, hexafluoropropylene (HFP), perfluoro (methyl vinyl ether) (PMVE), perfluoro(propyl vinyl ether) (PPVE), perfluoro(ethyl vinyl ether) (PEVE), chlorotrifluoroethylene (CTFE), perfluorobutyl ethylene (PFBE), or other monomer that introduces side groups into the molecule.

The fluoropolymer particles have a standard specific gravity (SSG) of less than 2.225, preferably less than 2.220, and more preferably from 2.180 to 2.215. The SSG is generally inversely proportional to the molecular weight of PTFE or modified PTFE. SSG alone, however, cannot specify molecular weight as it is also dependent on the presence of modifier, the amount of modifier, and/or initiation by hydrocarbon initiators such as DSP. Also no agreement exists as to the correct mathematical form the relationship takes. The first representation of that relationship is expressed in a paper presented by Doban et al. at an ACS meeting Sep. 18, 1956 which gives the number average molecular weight to be $$\overline{M_n} = 0.597[\log_{10}(0.157/(2.306-SSG)]^{-1}$$

with graphical data given in Sperati & Starkwather, Fortschr. Hochpolym-Forsch. Bd. 2, S.465–495 (1961). Another expression of this relationship is stated by Noda et al. in U.S. Pat. No. 5,324,785 as:

$$Log_{10}M_n = 31.83 - 11.58 \times SSG$$

in which $M_n$ is average molecular weight. These equations result in different molecular weights for the same SSG values.

Molecular weight can be more consistently related to melt creep viscosity (MCV) values for PTFE polymers and melt creep viscosity is used in the present application to describe the molecular weight of the polymer. Molecular weight is linearly related to melt viscosity in Pa·s to the 1/3.4 power as stated in the following:

$$\overline{M_n} = (MCV^{1/3.4} - 663.963)/0.00021967$$

Melt creep viscosities for the fluoropolymer in accordance with the invention are preferably greater than about $1.4 \times 10^{10}$ Pa·s, more preferably greater than about $1.5 \times 10^{10}$ Pa·s. Melt creep viscosity in this application is measured by the procedure U.S. Pat. No. 3,819,594 with certain modifications discussed below.

The fluoropolymer dispersion of this invention is made by dispersion polymerization (also known as emulsion polymerization). The product of dispersion polymerization is used as aqueous dispersion after concentrating and/or stabilizing with added surfactant as will be described below. The concentrated dispersions are useful as coating or impregnating compositions and to make cast films.

In the manufacture of dispersions in accordance with the invention, the polymerization is carried out to form a particle structure in which molecular weight, and in some embodiments, composition vary from one stage of polymerization to another. The variation can be can be envisioned so as to view the particle as having discrete layers. While the properties of the "core" and "shell" cannot be measured independently by analytical methods, these concepts are equated with polymer formed, respectively, in first and later stages in the polymerization. The process produces PTFE of high molecular weight at the core of the particle and PTFE or modified PTFE of lower molecular weight near and/or at the surface of the dispersion particles. As will be discussed below, the distinction made herein between core and shell relates to the amount of initiator present during the first (core) stage part of polymerization and during the later (shell) stage of polymerization as well as the presence or absence of telogenic agent and comonomer being introduced.

Particularly because of the core shell nature of the fluoropolymers of this invention, the melt creep viscosity measured at the end of the batch is a weighted average of melt creep viscosities of the PTFE formed during the batch. For a growing particle, each incremental volume with its molecular weight contributes to the average. If, for instance, the molecular weight is increasing during the batch, each incremental volume has a higher molecular weight than the last incremental volume and the average molecular weight is always lower than that of the last volume increment. The molecular weight of a volume increment is termed the instantaneous molecular weight and the number average molecular weight is given by the expression $$\overline{M_n} = \frac{\lim_{n \to \infty} \sum_{i=1}^{n} M_{ni} \Delta V}{\lim_{n \to \infty} \sum_{i=1}^{n} \Delta V}$$

where $M_{ni}$ is the instantaneous molecular weight and $\Delta V$ is a volume or weight increment. The instantaneous molecular weight for each volume increment is a value selected such that a numerically integrated solution of the above expression yields the experimentally determined average molecular weight at any point during the batch.

For the purposes of the present invention, the average molecular weight $M_n$ of the shell is determined by the numerical integration, using at least 5 volume or weight increments beginning with and including the increment in which the $M_{ni}$ is the highest and concluding with the end of the batch. The $M_n$ for the core is determined similarly using at least 30 volume or weight increments beginning with the start of polymerization and ending with and including the increment in which the $M_{ni}$ is the highest. Average melt creep viscosity is then determined using the formula stated above for the relationship of melt creep viscosity to $M_n$.

In accordance with the invention, the core of the particles comprises high molecular weight polytetrafluroethylene preferably having an average melt creep viscosity greater than about $1.2 \times 10^{10}$ Pa·s, preferably greater than about $1.3 \times 10^{10}$ Pa·s, and more preferably greater than about $1.5 \times$ $10^{10}$ Pa·s. The shell comprises lower molecular weight polytetrafluoroethylene or modified polytetrafluoroethylene preferably with an average melt creep viscosity greater than about $9\times10^9$ Pa·s and less than the average melt creep viscosity of polytetrafluoroethylene of the core. Preferably, the average melt creep viscosity of the polytetrafluoroethylene or modified polytetrafluoroethylene of the shell is at least $0.1\times10^{10}$ Pa·s, more preferably at least $0.2\times10^{10}$ Pa·s, less than the average melt creep viscosity of polytetrafluoroethylene of the core. Most preferably, the shell of lower molecular weight polytetrafluoroethylene or modified polytetrafluoroethylene has an average melt creep viscosity of about $9\times10^9$ Pa·s to about $1.3\times10^{10}$ Pa·s.

In fluoropolymers in accordance with the invention, the shell comprises about 5 to about 30% by weight of the particles. Preferably, the shell comprises about 5 to about 25% by weight of the particles, most preferably, about 5 to about 20% by weight of the particles. Preferably, the shell of the particles is polytetrafluoroethylene.

Fluoropolymers in accordance with this invention have the general character of known polymers made by dispersion polymerization processes. The resins of this invention isolated and dried are non-melt-processible. By non-melt-processible, it is meant that no melt flow is detected when tested by the standard melt viscosity determining procedure for melt-processible polymers. This test is according to ASTM D-1238–00 modified as follows: The cylinder, orifice and piston tip are made of corrosion resistant alloy, Haynes Stellite 19, made by Haynes Stellite Co. The 5.0 g sample is charged to the 9.53 mm (0.375 inch) inside diameter cylinder which is maintained at 372° C. Five minutes after the sample is charged to the cylinder, it is extruded through a 2.10 mm (0.0825 inch diameter), 8.00 mm (0.315 inch) long square-edge orifice under a load (piston plus weight) of 5000 grams. This corresponds to a shear stress of 44.8 KPa (6.5 pounds per square inch). No melt extrudate is observed.

In a preferred embodiment of the invention, the fluoropolymer is fibrillating. Fine powder resin isolated from dispersion and dried can be formed into useful articles by a lubricated extrusion process known as paste extrusion. The resin is blended with a lubricant and then shaped by an extrusion process. The beading obtained is coherent and microscopic examination reveals that many particles are linked by fibrils of PTFE which have been formed despite the procedure being conducted well below the melt temperature. Thus by "fibrillating", it is meant that a lubricated resin forms a continuous extrudate when extruded through a 1600:1 reduction die at 18.4 weight percent isoparaffin lubricant sold under the trademark Isopar® K by Exxon-Mobil Chemical. A further strengthening of the beading beyond the "green strength" obtained by fibrillation is accomplished by sintering after the lubricant has been volatized.

For preparation of a preferred fluoropolymer in accordance with the invention, a batch polymerization process is provided for producing a non-melt-processible dispersion. The polymerization process preferably involves the steps of precharging deionized water to a stirred autoclave and precharging saturated hydrocarbon having more than 12 carbon atoms which is liquid under polymerization conditions (preferably paraffin wax) and a dispersing agent (fluorinated surfactant), preferably a perfluorinated carboxylic acid having 6 to 10 carbon atoms. The hydrocarbon acts as a stabilizer in the polymerization process, preventing or retarding the formation of coagulated polymer in the agitated system. The process further involves deoxygenating, pressurizing the autoclave with TFE to predetermined level, agitating, and bringing the system to desired temperature, e.g., 60°–100° C.

To form the core, the polymerization is carried out in a first stage during which a first amount of free radical initiator, and additional dispersing agent (fluorinated surfactant) are added to the autoclave. The first amount of initiator preferably produces polytetrafluoroethylene having an average melt creep viscosity greater than about $1.2\times10^{10}$ Pa·s, more preferably $1.3\times10^{10}$ Pa·s. Preferably, the first amount of initiator produces polytetrafluroethylene having an average melt creep viscosity of greater than about $1.0\times10^{10}$ Pa·s before about 30% of the total tetrafluoroethylene has been polymerized (including the terafluroethylene displaced from the vapor space by the volume of polymer grown). During the first stage of the polymerization, the addition of agents providing telogenic activity is preferably minimized and most preferably the first stage is carried out without adding telogenic agents. In preferred forms of the present invention, these conditions promote the formation of rod-shaped particles i.e., having a length to diameter ratio greater than about 5. In addition, these conditions preferably promote the formation of large amounts of generally cylindrical particles having a length to diameter ratio greater than about 1.5. The polymerization proceeds and additional TFE is added to maintain pressure. Then, during the second stage of the reaction, a second amount of free radical initiator is added with a telogenic agent and, for modified PTFE, a comonomer. The second amount of initiator produces lower molecular weight polytetrafluoroethylene or modified polytetrafluoroethylene preferably with an average melt creep viscosity of the polytetrafluoroethylene or modified polytetrafluoroethylene of the shell greater than about $9\times10^9$ Pa·s and less than the average melt creep viscosity of the polytetrafluoroethylene of the core. Preferably, the average melt creep viscosity of the polytetrafluoroethylene or modified polytetrafluoroethylene of the shell is at least $0.1\times10^{10}$ Pa·s less, more preferably at least $0.2\times10^{10}$ Pa·s less than the average melt creep viscosity of polytetrafluoroethylene of the core. Most preferably, the polymer produced for the shell of lower molecular weight polytetrafluoroethylene or modified polytetrafluoroethylene has an average melt creep viscosity of about $9\times10^9$ Pa·s to about $1.3\times10^{10}$ Pa·s. The second amount of initiator is at least about 10 times the first amount of initiator, preferably at least about 25 times the first amount, more preferably at least about 50 times the first amount, and most preferably at least about 100 times the first amount. The second amount of initiator and telogenic agent are added before about 95% of the total tetrafluroethylene are polymerized. The second amount of initiator and telogenic agent are preferably added when at least about 70% of the total TFE has been polymerized, more preferably at least about 75% and most preferably at least about 80%.

During the first stage of the reaction, a high molecular weight core of PTFE is formed that is preferably at least about 70% of the mass of the fluoropolymer particle, more preferably at least about 75%, and most preferably at least about 80%. During the second stage of the reaction a shell of low molecular weight PTFE or modified PTFE is preferably formed that is complimentarily no more than about 30% of the mass of the fluoropolymer particle, more preferably no more than about 25% and most preferably no more than about 20%.

When the desired amount of TFE is consumed, the feeds are stopped, the reactor is vented, and the raw dispersion is discharged from the polymerization vessel. The supernatant paraffin wax is removed. The dispersion is coagulated, stabilized or concentrated depending on intended end use.

A graphic description of the process for an embodiment of this invention embodiment is illustrated in FIG. 1. The graph is a plot of the melt creep viscosity (MVC) to the 1/3.4 power of a preferred dispersion polymerization process of this invention. The average MCV to the 1/3.4 power of the growing polymer is plotted against the percentage of total tetrafluoroethylene polymerized. It is to be noted that the percentages of total TFE consumed is analogous to the fraction of particle volume or weight formed.

As stated earlier, the MCV is can be correlated with the molecular weight of the polymer. Curve A represents the average MCV to the 1/3.4 power of polymer at various stages in the completion of the batch polymerization. All references in this application to % completion of batch polymerization include the terafluoroethylene displaced from the vapor space by the volume of polymer grown. In general the molecular weight of the batch increases until a decline of the curve begins at about 88% of total polymer formation. The increase of average MCV (increase in molecular weight) illustrates the formation of a high molecular weight core of PTFE in the first stage of the polymerization. The slight decrease of average MCV (decrease in molecular weight) towards the end of the polymerization is attributable to the formation of the lower molecular shell in the second stage of the reaction. For this embodiment the average MCV values of the polymer obtainable from Curve A indicate an average MCV of about $1.3 \times 10^{10}$ Pa·s at 30% completion; an average MCV of about $2.1 \times 10^{10}$ Pa·s at 88% completion and an average MCV of about $1.8 \times 10^{10}$ Pa·s at 100% completion. The maximum average MCV (maximum molecular weight) is obtained at about 88% completion just prior to the addition of telogenic agent and more initiator and shell formation. The final average MCV value at 100% completion is indicative of the high molecular weight desired for PTFE dispersions in use in order to achieve high flex life.

A more vivid illustration is represented by Curve B. Curve B is a theoretical depiction of the "instantaneous MCV" to the 1/3.4 power of polymer at various stages in the completion of the batch polymerization. The instantaneous MCV, as defined earlier, shows the effect of the changing recipe conditions on the volume increment growing on the surface of a particle at that instant. The instantaneous MCV and associated instantaneous molecular weight increases until the shell portion of the batch is begun. The precipitous decline of the instantaneous MCV reflects the addition of telogenic agents and added initiator. For this embodiment, the instantaneous MCV values of the polymer obtainable from Curve B indicate an instantaneous MCV of about $2.0 \times 10^{10}$ Pa·s at 30% completion; an instantaneous MCV of about $3.1 \times 10^{10}$ Pa·s at 88% completion and an instantaneous MCV of about $6.3 \times 10^{9}$ Pa·s at 100% completion.

The dispersing agent used in this process is preferably a fluorinated surfactant. Preferably, the dispersing agent is a perfluorinated carboxylic acid having 6–10 carbon atoms and is typically used in salt form. Suitable dispersing agents are ammonium perfluorocarboxylates, e.g., ammonium perfluorocaprylate or ammonium perfluorooctanoate.

The initiators preferably used in the process of this invention are free radical initiators. They may be those having a relatively long half-life, preferably persulfates, e.g., ammonium persulfate or potassium persulfate. To shorten the half-life of persulfate initiators, reducing agents such as ammonium bisulfite or sodium metabisulfite, with or without metal catalysis salts such as Fe (III), can be used. Alternatively, short half-life initiators such as potassium permanganate/oxalic acid can be used.

In addition to the long half-life persulfate initiators preferred for this invention, small amounts of short chain dicarboxylic acids such as succinic acid or initiators that produce succinic acid such as disuccinic acid peroxide (DSP) may be also be added in order to reduce coagulum.

To produce the high molecular weight PTFE core, preferably no telogenic agent is added in the first stage of the reaction. In addition, quantities of agents with telogenic activity are minimized. In contrast, in the second stage of the reaction, such agents in addition to more initiator are added to reduce the molecular weight of that reached in the core. For the purposes of this patent application, the term telogenic agent broadly refers to any agent that will prematurely stop chain growth and includes what is commonly known as chain transfer agents. The term chain transfer implies the stopping of growth of one polymer chain and the initiation of growth of another in that the number of growing polymer radicals remains the same and the polymerization proceeds at the same rate without the introduction of more initiator. A telogenic agent produces lower molecular weight polymer in its presence than in its absence and the number of polymer chain radicals growing either remains the same or decreases. In practice most agents, if present in sufficient quantities, tend to decrease the number of radicals and ultimately the polymerization rate. In order to maintain rate, addition of initiator with or near the time of the agent is desirable. The telogenic agents used in this invention to produce the low molecular weight shell are typically non-polar and may include hydrogen or an aliphatic hydrocarbon or halocarbon or alcohol having 1 to 20 carbon atoms, usually 1 to 8 carbon atoms, e.g., alkanes such as ethane, or chloroform or methanol. Also effective are mercaptans such as dodecylmercaptan.

In producing a shell of modified PTFE, in addition to telogenic agent, comonomer is added in the second stage of the reaction. As stated above typical comonomers include hexafluoropropylene (HFP), perfluoro(methyl vinyl ether) (PMVE), perfluoro(propyl vinyl ether) (PPVE), perfluoro (ethyl vinyl ether) (PEVE), chlorotrifluoroethylene (CTFE), and perfluorobutyl ethylene (PFBE).

Surfactants

For dispersion concentration, a nonionic concentrating surfactant is added to raw dispersion and the polymer is held at a temperature above the cloud point of the nonionic surfactant. Once concentrated to above about 30%, preferably about 30 to about 70 weight % fluoropolymer, and more preferably about 45 to about 65 weight % fluoropolymer, the upper clear supernate is removed. Further adjustment of the final solids concentration and surfactant are made as needed. One patent illustrative of procedures useful for concentrating is U.S. Pat. No. 3,037,953 to Marks and Whipple.

The surfactant used in this invention comprises an alcohol ethoxylate or mixture of alcohol ethoxylates of the formula:

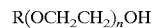

R(OCH$_2$CH$_2$)$_n$OH wherein R is a branched alkyl, branched alkenyl, cycloalkyl, or cycloalkenyl hydrocarbon group having 8–18 carbon atoms and n is an average value of 5 to 18. For example, the ethoxylate of this invention can be considered to be prepared from (1) a primary alcohol that is comprised of a hydrocarbon group selected from branched alkyl, branched alkenyl, cycloalkyl or cycloalkenyl or (2) a secondary or tertiary alcohol. In any event, the ethoxylate of this invention does not contain an aromatic group. The number of ethylene oxide units in the hydrophilic portion of the molecule may comprise either a broad or narrow monomodal distribution as typically supplied or a broader or bimodal distribution which may be obtained by blending.

The cloud point of a surfactant is a measure of the solubility of the surfactant in water. The aqueous dispersion of this invention has a cloud point of about 50° C. to about 85° C., preferably about 59° C. to about 70° C.

As will be shown below by example, the branched surfactants selected for this invention surprisingly increase the shear stability of the dispersion composition when concentrated with linear alcohol ethoxylates and can equal or exceed the performance of fluoropolymer dispersions concentrated with alkyl phenol ethoxylates. Gel time is a measure of the shear stability of a composition. An aqueous dispersion of the invention wherein the molecular weight of the polytetrafluoroethylene or modified polytetrafluoroethylene in the shell is sufficiently low so that dispersion at about 60 weight % fluoropolymer and about 6 weight % surfactant has a gel time of greater than about 700 seconds, preferably greater than about 800 seconds, more preferably greater than about 1000 seconds and most preferably greater than about 1200 seconds.

Further the surfactants of this invention contain no aromatic group that can thermally decompose and be converted to harmful organic aromatic compounds that may adversely affect air and water quality during dispersion application processes and produce tar-like buildup on coating equipment and exhaust ducts. The preferred surfactants used in this invention burn off cleanly without thermally decomposing on a substrate to leave a discolored coated product and without carbonizing thereby eliminating unwanted transfer of carbon particles to a coated product.

In addition to the above advantages, the preferred alcohol ethoxylate surfactants burn off at a lower temperature (about 50° C. lower) than the conventional alkyl phenol ethoxylates. This can be beneficial in some applications where the surfactant must be removed thermally but the product cannot be sintered. Examples of applications of these types are impregnated fibers for sealing applications and filtration fabrics. With the conventional alkyl phenol ethoxylates, the surfactant burn-off temperature is very near the sintering temperature. The alcohol ethoxylate surfactants thus offer a wider operating window.

Nonionic surfactants of the type generally used to stabilize fluoropolymer dispersions can be either liquids or solids at room temperature. If solid, the surfactant tends to be pasty and difficult to handle. These are typically not free-flowing granular solids. They can be handled but often require heated tanks and transfer lines to keep them as a liquid. In addition to the capital cost of the heated equipment, there are operational restrictions placed on the system. If the temperature is maintained too low, tanks and transfer lines can become plugged with solid material. If the temperature is too high, degradation of the surfactant can occur.

Generally low viscosity liquids are preferred from a handling point of view. High viscosity liquids are more difficult to handle and often require heated tanks and lines to keep the viscosity low enough for ease in handling. Some of the apparent liquid surfactants are physically meta-stable in that they may exist as liquids for several days and then turn into pasty solids. Sometimes water is added to the surfactant to lower its viscosity and making it easier to handle. However, too much water detracts from the desire to use more concentrated dispersions for coating operations.

The aqueous dispersion of non-melt-processible fluoropolymer particles and nonionic surfactant used in this invention preferably contain a nonionic surfactant containing 0–20 weight % water, preferably 0–15 weight % water and is a stable liquid at room temperature. A surfactant is considered to be a stable liquid if it remains liquid for 3 days at room temperature after being chilled to 5° C. and then warmed to room temperature (about 23±3° C.).

The dispersions of this invention can be used as coating compositions on any number of substrates including metal and glass. The dispersions are applied to substrates and baked to form a baked layer on the substrate. When baking temperatures are high enough, the primary dispersion particles fuse and become a coherent mass. Coating compositions of dispersions of this invention can be used to coat fibers of glass, ceramic, polymer or metal and fibrous structures such as conveyor belts or architectural fabrics, e.g., tent material. The coatings of this invention when used to coat metal substrates have great utility in coating cooking utensils such as frying pans and other cookware as well as bakeware and small electrical household appliances such as grills and irons. Coatings of this invention can also be applied to equipment used in the chemical processing industry such as mixers, tanks and conveyors as well as rolls for printing and copying equipment.

Alternately the dispersions can be used to impregnate fibers for sealing applications and filtration fabrics. Further the dispersions of this invention can be deposited onto a support and subsequently dried, thermally coalesced, and stripped from the support to produce self-supporting films cast from the dispersion. Such cast films are suitable in lamination processes for covering substrates of metal, plastic, glass, concrete, fabric and wood.

The dispersions of this invention demonstrate high shear stability. The high shear stability permits these dispersions to withstand forces applied by shear generated by pumping and mixing operations during coating application. High shear stability facilitates internal recycling of coatings necessary for continuous operations for many application processes.

TEST METHODS

Raw Dispersion Properties:

Solids content of PTFE raw (as polymerized) dispersion are determined gravimetrically by evaporating a weighed aliquot of dispersion to dryness, and weighing the dried solids. Solids content is stated in weight % based on combined weights of PTFE and water. Alternately solids content can be determined by using a hydrometer to determine the specific gravity of the dispersion and then by reference to a table relating specific gravity to solids content. (The table is constructed from an algebraic expression derived from the density of water and density of as polymerized PTFE.) Raw dispersion particle size (RDPS) is measured by photon correlation spectroscopy.

Surfactant Content:

The surfactant and solids content of stabilized dispersion are determined gravimetrically by evaporating a small weighed aliquot of dispersion to dryness following in general ASTM D-4441 but using a time and temperature such that water but not the surfactant is evaporated. This sample is then heated at 380° C. to remove the surfactant and reweighed. Surfactant content is usually stated in weight % based on PTFE solids.

Resin Properties:

Standard specific gravity (SSG) of PTFE fine powder resin is measured by the method of ASTM D-4895. If a surfactant is present, it can be removed by the extraction procedure in ASTM-D-4441 prior to determining SSG by ASTM D-4895.

Melt creep viscosity (MCV) is measured at 380° C. by a modification of the tensile creep method disclosed in U.S. Pat. No. 3,819,594, with the mold at room temperature, using a molding pressure of 200 kg/cm$^2$ (19.6 MPa), with the molding pressure held for 2 min, using a load (total weight suspended from the sample sliver) that varies with the MV to obtain a creep rate suitable for measurement, and waiting at least 30 min after application of the load for elastic response to be complete before selecting viscous response (creep) data for use in the calculation.

Copolymer Composition:

Comonomer content of the modified PTFE resins is determined by Fourier transform infrared spectroscopy using the method disclosed in U.S. Pat. No. 4,837,267. For PPVE-modified PTFE, a multiplicative factor of 0.97 derived from the calibration curve is used to convert the ratio of the absorbance at 995 cm$^{-1}$ to that at 2365 cm$^{-1}$ to PPVE content in weight %.

Cloud Point:

The cloud point of a surfactant is a measure of the solubility of the surfactant in water and can be determined by the procedure outlined in ASTM D2024 entitled Cloud Point of Nonionic Surfactants.

Thermal Concentration Procedure:

In order to determine shear stability, the raw dispersion as polymerized (approximately 45% solids in the examples of this invention) is concentrated. The specific gravity of the raw dispersion is measured with a hydrometer. From the relationship between specific gravity, the % solids in the dispersion can be determined. The difference between the total dispersion weight and the net weight of the solids is the amount of water present.

For the thermal concentration procedure, 1200 grams of raw dispersion is used. The specific gravity is measured and the amounts of water and PTFE solids are determined. 1.1 grams of a 10% solution of citric acid in water are added and the dispersion gently stirred. 7 ml of concentrated ammonium hydroxide (28%) is then added. The dispersion in then heated to 40° C. and the surfactant is added. The amount of surfactant used is 6.0% based on the amount of water present. If the surfactant is not 100% active as received, this is taken into consideration so as to have 6.0% active ingredients based on water.

The dispersion is concentrated in glass beakers placed in temperature controlled water baths. The beaker is covered with aluminum foil to prevent excess evaporation of water. Once the dispersion has reached the desired concentration temperature, 80° C., the dispersion is stirred and then allowed to remain at 80° C. for 1 hour. The water bath heaters are then turned off and the dispersion is allowed to cool to room temperature. The upper supernate phase is then removed using a water aspirator.

After the supernate is removed, the sample is stirred and the % solids and surfactant are determined by the methods described above. In this test, the dispersion is dried to remove the water and then heated at 380° C. to remove the surfactant. The percent solids are then adjusted to 60% by addition of demineralized water and additional surfactant is then added to increase the surfactant level to 6% based on the PTFE solids. The dispersion is then filtered through a 50 micron filter.

Shear Stability:

The shear stability is measured by the time it takes for the dispersion to gel when sheared at high rates. The dispersion is concentrated as described above and 200 ml of dispersion is placed in a Waring commercial explosion resistant blender (Model 707SB, one quart size, 2 speed, air requirements—10 scfm @ 10 psi, available from Waring of New Hartford, Conn.). This blender has a capacity of 1 liter and has an air purge for the motor. The dispersion is stirred at the highest speed until the dispersion gels. The gel point is quite sharp and easy to determine. The gel time is recorded is seconds. If the dispersion does not gel in ½ hour (1800 seconds), the test is terminated to avoid damage to the blender. The blender is then completely disassembled and cleaned after each determination.

Surfactant Viscosity:

To determine the true state of surfactants, all surfactants are cooled to 5° C. Almost all the surfactants become solid under these conditions. When warmed to room temperature, several become liquids again within one hour. Others remained solid for weeks and never turn to liquid. A surfactant is considered to be a stable liquid if it remains liquid for three days at room temperature after being chilled to 5° C. and then warmed to room temperature (about 23±3° C.).

The viscosity of the liquid surfactants is measured with a Brookfield Viscometer Model NVF at 60 RPM using a #2 spindle.

EXAMPLES

Unless otherwise specified, solution concentrations are stated in weight % based on combined weights of solute and solvent water.

Preparation of Polymer Resin (core/shell)

A polykettle having a horizontal agitator and a water capacity of 240 parts by weight is charged with 123.5 parts of demineralized water and 5.82 parts of a paraffin wax supplied by Exxon. The contents of the polykettle are heated to 65° C. and the polykettle is evacuated and purged with tetrafluoroethylene (TFE). Into the evacuated polykettle is charged 3.24 parts of a solution containing 0.0616 parts of ammonium perfluorooctanoate. The contents of the polykettle are agitated at 50 rpm. The temperature is increased to 90° C. TFE is then added until the pressure is 2.72 MPa. Then 1.29 parts of a fresh initiator solution of 0.01 parts of disuccinyl peroxide and 0.00005 parts ammonium persulfate (APS) per part of water are added at the rate of 0.129 parts/minute. Once the pressure has declined by 0.1 MPa, the batch is considered to have kicked off. TFE is then added at a rate sufficient to maintain the pressure at 2.72 MPa. Once 8.81 parts of TFE have reacted from the kick off, 6.47 parts of a 2.46 weight % of ammonium perfluorooctonate solution is added at a rate of 0.324 parts per minute. TFE is added at a rate sufficient to maintain the pressure at 2.75 MPa. After 88.1 parts of TFE have been added following initial pressurizing with TFE, an additional 3.24 parts of a solution of 0.005 parts of APS and 0.060 parts of methanol per part of solution are added at the rate of 0.647 parts per minute. The polymerization time from kick off to second initiator addition is 68 minutes. After 96.9 parts of TFE have been added, the TFE feed is stopped and the polykettle pressure is allowed to decrease to 0.79 MPa. Once that pressure has been reached, the agitator is turned off and the batch vented. The length of the reaction from kick off to cessation of agitation is 87 minutes. The contents of the polykettle are discharged and the supernate wax layer is removed. Solids content of the raw dispersion is 45.8% and the Raw Dispersion Particle Size is 263 nm. The PTFE resin obtained has an SSG of 2.1917 and a melt creep viscosity of 19.5×10$^9$ Pa·sec. The average melt creep viscosity of the core of the resin particles is 2.27×10$^{10}$ Pa·s and the average melt creep viscosity of the shell of the resin particles is 9.8×10$^9$ Pa·s. The core comprises 88.3% by weight of the particles, the shell comprising 11.7% by weight.

Comparative Example A

The base resin is thermally concentrated using Serdox NBS 6,6 provided by Servo Huls, Delden, the Netherlands.

This is described as an alcohol ethoxylate based on a primary linear alcohol. The neat surfactant is a liquid at room temperature and has a viscosity of 43 cps. After adjusting the solids to 60% and the surfactant to 6% based on PTFE solids, the gel time is measured at 452 seconds.

Comparative Example B

The base dispersion is thermally concentrated using Serdox NES 8.0 available from Servo Huls, Delden, the Netherlands. This is described as an alcohol ethoxylate based on a primary linear alcohol. This is a liquid at room temperature. After adjusting the solids to 60% and the surfactant to 6% based on PTFE solids, a gel time of 585 seconds is measured.

Comparative Example C

Shear stability is determined of commercially available PTFE resin dispersion, Teflon® 30 available from E. I. du Pont de Nemours and Company of Wilmington, Del. containing 60% PTFE solids and 6% Triton X-100 (Dow Chemical) based on PTFE solids. The polymer resin does not have a core/shell structure. The surfactant is described as an octyl phenol ethoxylate. The neat surfactant is a liquid at room temperature and has a viscosity of 240 cps. The resulting dispersion has a gel time of 350 seconds in the blender test.

Example 1

The base dispersion is thermally concentrated using Leocol SC-90 available from Lion Corporation, Japan. This surfactant is a branched ethoxylate represented by the formulas of $C_{12}H_{25}O(C_2H_4O)_9H$ and $C_{14}H_{29}O(C_2H_4O)_9H$ formed from a secondary alcohol. The surfactant is a liquid at room temperature with a viscosity of 65 cps. After adjusting the solids to 60% and the surfactant to 6% based on PTFE solids, a gel time of 850 seconds is measured.

Example 2

The base dispersion is thermally concentrated using Leocol TD-90 available from Lion Corporation, Japan. This surfactant is a branched ethoxylate represented by the formula $C_{13}H_{27}O(C_2H_4O)_9H$ formed from a branched secondary alcohol. The neat surfactant is a solid at room temperature. After adjusting the solids to 60% and the surfactant to 6% based on PTFE solids, a gel time of 1241 seconds is measured.

Example 3

The base dispersion is concentrated using a blend of 30% Tergitol TMN-6 and 70% Tergitol TMN-10 available from Dow Chemical Corporation. These are described as alcohol ethoxylates that differ only in the ethylene oxide content. The alcohol used to make this surfactant is 2,6,8-trimethyl-4-nananol, which is a branched secondary alcohol. This surfactant blend is a liquid at room temperature with a viscosity of 92 cps. After concentration the solids are adjusted to 60% and the surfactant blend to 6% based on PTFE solids. The gel time is 1530 seconds.

Example 4

The base dispersion is concentrated using Witcanol TD-100 available from Witco Corporation. It is described as an alcohol ethoxylate made from a primary branched alcohol. It is a solid at room temperature. After concentration, the % solids were adjusted to 60% and the surfactant to 6% based on PTFE solids. The gel time was 1737 seconds.

Example 5

The base dispersion is thermally concentrated using Novel II TDA 9.4 available from Condea Vista Corporation. It is described as an alcohol ethoxylate made from a branched primary alcohol. The neat surfactant is a liquid at room temperature and has a viscosity of 100 cps. After adjusting the solids to 60% and the surfactant to 6% based on PTFE solids, a gel time of 1597 seconds is measured.

Example 6

The base dispersion is concentrated with a 50/50 weight blend of Surfonic TDA-9 and Surfonic TDA-11 available from Huntsman Chemical Company. These differ only in the ethylene oxide content. These are described as alcohol ethoxylates made from a branched primary alcohol. The blend is a solid at room temperature. After adjusting the solids to 60% and the surfactant to 6% based on PTFE solids, a gel time of 1603 seconds is obtained.

These results are summarized in Table 1.

TABLE 1

| Example | Alcohol Structure | Surfactant State @ RT | Cloud Point ° C. | Gel Time, seconds |
|---|---|---|---|---|
| A | Primary, linear | Liquid | 64 | 452 |
| B | Primary, linear | Liquid | 68 | 585 |
| C | Alkyl Phenol | Liquid | 65 | 350 |
| 1 | Secondary | Liquid | 56 | 850 |
| 2 | Primary, branched | Solid | 59 | 1241 |
| 3 | Secondary, branched | Liquid | 65 | 1530 |
| 4 | Primary, branched | Solid | 67 | 1737 |
| 5 | Primary branched | Liquid | 65 | 1597 |
| 6 | Primary, branched | Solid | 64 | 1603 |

What is claimed is:

1. An aqueous dispersion comprising:
   about 30 to about 70 weight % non-melt-processible fluoropolymer particles having a Standard Specific Gravity (SSG) of less than about 2.225, said fluoropolymer particles comprising a core of high molecular weight polytetrafluoroethylene and a shell of lower molecular weight polytetrafluoroethylene or modified polytetrafluoroethylene; and
   about 2 to about 11 weight % surfactant based on the weight of said fluoropolymer comprising a compound or mixture of compounds of the formula:

$R(OCH_2CH_2)_nOH$ wherein R is a branched alkyl, branched alkenyl, cycloalkyl, or cycloalkenyl hydrocarbon group having 8–18 carbon atoms and n is an average value of 5 to 18.

2. The aqueous dispersion of claim 1 comprising about 3 to about 11 weight % of said surfactant based on the weight of said fluoropolymer.

3. The aqueous dispersion of claim 1 comprising from about 45 to about 65 weight % non-melt processible fluoropolymer.

4. The aqueous dispersion of claim 1 wherein the average melt creep viscosity of the polytetrafluoroethylene of said core is greater than about $1.2 \times 10^{10}$ Pa·s.

5. The aqueous dispersion of claim 1 wherein the average melt creep viscosity of the polytetrafluoroethylene of said core is greater than about $1.3 \times 10^{10}$ Pa·s.

6. The aqueous dispersion of claim 1 wherein the average melt creep viscosity of the polytetrafluoroethylene of said core is greater than about $1.5 \times 10^{10}$ Pa·s.

7. The aqueous dispersion of claim 1 wherein the average melt creep viscosity of the polytetrafluoroethylene or modified polytetrafluoroethylene of said shell is greater than about $9 \times 10^9$ Pa·s and less than the average melt viscosity of polytetrafluoroethylene of said core.

8. The aqueous dispersion of claim 1 wherein the average melt creep viscosity of the polytetrafluoroethylene or modified polytetrafluoroethylene of said shell is at least $0.1 \times 10^{10}$ Pa·s less than the average melt creep viscosity of polytetrafluoroethylene of said core.

9. The aqueous dispersion of claim 1 wherein the average melt creep viscosity of the polytetrafluoroethylene or modified polytetrafluoroethylene of said shell is at least $0.2 \times 10^{10}$ Pa·s less than the average melt creep viscosity of polytetrafluoroethylene of said core.

10. The aqueous dispersion of claim 1 wherein the average melt creep viscosity of the polytetrafluoroethylene or modified polytetrafluoroethylene of said shell is about $9 \times 10^9$ Pa·s to about $1.3 \times 10^{10}$ Pa·s.

11. The aqueous dispersion of claim 1 wherein said shell comprises about 5 to about 30% by weight of said fluoropolymer particles.

12. The aqueous dispersion of claim 1 having a cloud point of about 50° C. to about 85° C.

13. The aqueous dispersion of claim 1 having a cloud point of about 59° C. to about 70° C.

14. The aqueous dispersion of claim 1 wherein said surfactant containing 0–20 weight % water is a stable liquid at room temperature.

15. The aqueous dispersion of claim 1 wherein said surfactant containing 0–15 weight % water is a stable liquid at room temperature.

16. The aqueous dispersion of claim 1 wherein the molecular weight of the polytetrafluoroethylene or modified polytetrafluoroethylene in the shell is sufficiently low that said dispersion at about 60 weight % fluoropolymer and at about 6 weight % surfactant has a gel time greater than about 700 seconds.

17. The aqueous dispersion of claim 1 wherein the molecular weight of the polytetrafluoroethylene or modified polytetrafluoroethylene in the shell is sufficiently low that said dispersion at about 60 weight % fluoropolymer and at about 6 weight % surfactant has a gel time greater than about 800 seconds.

18. The aqueous dispersion of claim 1 wherein the molecular weight of the polytetrafluoroethylene or modified polytetrafluoroethylene in the shell is sufficiently low that said dispersion at about 60 weight % fluoropolymer and at about 6 weight % surfactant has a gel time greater than about 1000 seconds.

19. The aqueous dispersion of claim 1 wherein the molecular weight of the polytetrafluoroethylene or modified polytetrafluoroethylene in the shell is sufficiently low that said dispersion at about 60 weight % fluoropolymer and at about 6 weight % surfactant has a gel time greater than about 1200 seconds.

20. The aqueous dispersion of claim 1 wherein the shell is polytetrafluoroethylene.

21. The aqueous dispersion of claim 1 wherein the fluoropolymer is fibrillating.

22. The aqueous dispersion of claim 1 wherein said fluoropolymer has a melt creep viscosity of greater than about $1.4 \times 10^{10}$ Pa·s.

23. A coating composition of the aqueous dispersion of claim 1.

24. A coating composition in the form of a baked layer of an aqueous dispersion comprising:

about 30 to about 70 weight % non-melt-processible fluoropolymer particles having a Standard Specific Gravity (SSG) of less than about 2.225, said fluoropolymer particles comprising a core of high molecular weight polytetrafluoroethylene and a shell of lower molecular weight polytetrafluoroethylene or modified polytetrafluoroethylene; and about 2 to about 11 weight % surfactant based on the weight of said fluoropolymer comprising a compound or mixture of compounds of the formula:

$$R(OCH_2CH_2)_nOH$$

wherein R is a branched alkyl, branched alkenyl, cycloalkyl, or cycloalkenyl hydrocarbon group having 8–18 carbon atoms and n is an average value of 5 to 18.

25. A substrate coated with the composition of claim 24.

26. The substrate of claim 25 wherein the substrate is metal.

27. The substrate of claim 25 wherein the substrate is glass fabric.

28. A self-supporting film cast from an aqueous dispersion comprising:

about 30 to about 70 weight % non-melt-processible fluoropolymer particles having a Standard Specific Gravity (SSG) of less than about 2.225, said fluoropolymer particles comprising a core of high molecular weight polytetrafluoroethylene and a shell of lower molecular weight polytetrafluoroethylene or modified polytetrafluoroethylene; and about 2 to about 11 weight % surfactant based on the weight of said fluoropolymer comprising a compound or mixture of compounds of the formula:

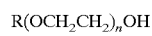

$$R(OCH_2CH_2)_nOH$$

wherein R is a branched alkyl, branched alkenyl, cycloalkyl, or cycloalkenyl hydrocarbon group having 8–18 carbon atoms and n is an average value of 5 to 18.

* * * * *